(12) United States Patent
Cho et al.

(10) Patent No.: US 8,576,371 B2
(45) Date of Patent: Nov. 5, 2013

(54) LIQUID CRYSTAL DISPLAY DEVICE

(75) Inventors: Sung Hyun Cho, Gumi-so (KR); Ki Taeg Shin, Gumi-si (KR); Dong Ho Lee, Gumi-si (KR)

(73) Assignee: LG Display Co. Ltd., Seoul (KR)

( * ) Notice: Subject to any disclaimer, the term of this patent is extended or adjusted under 35 U.S.C. 154(b) by 556 days.

(21) Appl. No.: 12/644,950

(22) Filed: Dec. 22, 2009

(65) Prior Publication Data

US 2011/0025959 A1 Feb. 3, 2011

(30) Foreign Application Priority Data

Jul. 31, 2009 (KR) .................. 10-2009-0070525

(51) Int. Cl.
*G02F 1/1339* (2006.01)
(52) U.S. Cl.
USPC .......................... 349/156; 349/155; 349/192
(58) Field of Classification Search
USPC ........................................... 349/155, 106, 19
See application file for complete search history.

(56) References Cited

U.S. PATENT DOCUMENTS

| | | | |
|---|---|---|---|
| 6,683,671 B1 * | 1/2004 | Morimoto | 349/155 |
| 2003/0137631 A1 * | 7/2003 | Nakayoshi et al. | 349/155 |
| 2007/0120152 A1 * | 5/2007 | Chang et al. | 257/270 |
| 2009/0015780 A1 * | 1/2009 | Choi et al. | 349/156 |
| 2010/0128207 A1 * | 5/2010 | Hwang et al. | 349/106 |

FOREIGN PATENT DOCUMENTS

| | | |
|---|---|---|
| KR | 1020010015210 A | 2/2001 |
| KR | 1020080063016 A | 7/2008 |
| TW | 518650 B | 1/2003 |
| TW | 567380 B | 12/2003 |

OTHER PUBLICATIONS

Office Action issued in corresponding Chinese Patent Application No. 200911000247.9, mailed Sep. 20, 2011.
Office Action issued in corresponding Korean Patent Application No. 10-2009-0070525, mailed Feb. 25, 2013.
Office Action issued in corresponding Taiwan Patent Application No. 098144850, mailed Jan. 18, 2013.

* cited by examiner

*Primary Examiner* — Edward Glick
*Assistant Examiner* — Sang V Nguyen
(74) *Attorney, Agent, or Firm* — Brinks Hofer Gilson & Lione

(57) ABSTRACT

An LCD device is disclosed. The LCD device includes: a first substrate configured to include an active area in which a plurality of thin film transistors, a plurality of pixel electrodes, a plurality of gate lines, and a plurality of data lines are formed for displaying an image, and a dummy area loaded with a driving circuit which is connected to the plurality of gate lines; a second substrate, opposite to the first substrate, configured to include a common electrode together with the plurality of pixel electrodes used for forming electric fields, and color filters and a black matrix formed opposite to the active area; column spacers secured to the first substrate within the active and dummy areas and configured to maintain a constant cell gap between the first and second substrates; and a liquid crystal layer interposed between the first and second substrates. The second substrate is configured to further include color filter patterns formed on its portions opposite to only the column spacers within the dummy area.

6 Claims, 3 Drawing Sheets

LIQUID CRYSTAL DISPLAY DEVICE

This application claims the benefit of Korea Patent Application No. 10-2009-0070525, filed on Jul. 31, 2009, the entire contents of which is incorporated herein by reference for all purposes as if fully set forth herein.

BACKGROUND

1. Field of the Invention

This disclosure relates to liquid crystal display device, and more particularly to a liquid crystal display device and manufacturing method thereof adapted to minimize capacitance between a thin film transistor array and a color filter array substrate by enlarging the distance between the two substrates in a dummy area using color patterns which are formed on the color filter array substrate and also opposite to column spacers within the dummy area loaded with a driving circuit for gate lines.

2. Discussion of the Related Art

In general, the LCD device includes an LCD panel and driving circuits which are configured to drive the LCD panel. The LCD panel is configured to include a thin film transistor array substrate and a color filter array substrate opposite to each other, and a liquid crystal layer interposed between the two substrates. The thin film transistor array substrate and the color filter array substrate are combined to maintain a fixed cell gap. The liquid crystal layer is formed in the fixed cell gap.

The driving circuits include at least two gate driver integrated-circuit chips, at least two data driver integrated-circuit chips, a timing controller, and a power supply unit. The gate driver integrated-circuits sequentially apply a scan signal to gate lines on the LCD panel. The data driver integrated-circuit chips apply image information to pixels through data lines on the LCD panel, in synchronization with the sequential supply of scan signals from the gate driver integrated-circuit chips. The timing controller controls the gate and data driver integrated-circuit chips. The power supply unit generates a variety of driving voltages necessary to drive the LCD device.

Such driver integrated-circuit chips are generally connected to the LCD panel in a TAP (tape automated bonding) system or a COG (chip-on-glass) system. The TAP system mounts at least one driver integrated-circuit on a flexible thin-film made from a high polymer material and connects the flexible thin-film with the LCD panel. In other words, the TAP system combines at least one driver integrated-circuits chip and a flexible thin-film in a package (i.e., a tape carrier package (TCP)) and connects the package with the LCD panel. As such, the TAP system is often referred to as a TCP (tape carrier package) system. The COG system mounts the driver integrated-circuit chips on the LCD panel, thereby directly connecting the driver integrated-circuit chips with the LCD panel.

Also, the COP system can enable control signals and driving voltages from the timing controller and the power supply unit to be applied to the gate and data driver integrated-circuit chips through a plurality of signal lines on the LCD panel. To rectify this, the COG system can transmit the control signal and the driving voltages using the plurality of signal lines formed in a LOG (line-on-g lass) type.

The LCD panel is divided into an active area A/A is used for displaying images and a dummy area D/A which is not used for displaying the images. If the COG system is applied to the LCD device, a gate driving circuit configured to drive the gate lines is formed on the dummy area D/A of an LCD panel. The gate driving circuit on the dummy area D/A can be configured to include a plurality of transistors, a plurality of logical elements, a plurality of capacitors, and a plurality of resistors.

Moreover, the LCD panel is configured to include the thin film transistor array substrate and the color filter substrate combined to maintain the fixed cell gap, and a liquid crystal layer interposed between the two substrates, as described above. In order to maintain the fixed cell gap, the LCD panel further includes column spacers (or patterned spacers) secured to the thin film transistor array substrate or the color filter array substrate. The column spacers are formed on all of the active and dummy areas A/A and D/A in the LCD panel.

The column spacers on the active area A/A are secured to any one of the thin film transistor array substrate and the color filter array substrate in a desired alignment. To rectify this, the column spacers on the active area A/A are arranged to form a fixed shape, for example, a lozenge pattern. Accordingly, the uniform cell gap is maintained in the active area A/A.

Similarly, the column spacers are formed in the desired alignment on the dummy area D/A of the LCD panel. However, the size of the dummy area D/A is considerably small in comparison with that of the active area A/A. Nevertheless, the column spacers on the dummy area D/A have been arranged in the same alignment as those on the active area A/A. This results in the column spacers on the dummy area D/A being non-uniformly arranged unlike those on the active area A/A. As such, the cell gap within the dummy area D/A loses uniformity.

BRIEF SUMMARY

An LCD device includes: a first substrate configured to include an active area in which a plurality of thin film transistors, a plurality of pixel electrodes, a plurality of gate lines, and a plurality of data lines are formed for displaying an image, and a dummy area loaded with a driving circuit which is connected to the plurality of gate lines; a second substrate, opposite to the first substrate, configured to include a common electrode together with the plurality of pixel electrodes used for forming electric fields, and color filters and a black matrix formed opposite to the active area; column spacers secured to the first substrate within the active and dummy areas and configured to maintain a constant cell gap between the first and second substrates; and a liquid crystal layer interposed between the first and second substrates. The second substrate is configured to further include color filter patterns formed on its portions opposite to only the column spacers within the dummy area.

According to one general aspect of the present embodiment, a manufacturing method of LCD device includes: first and second substrates each defined into an active area and a dummy area and combined opposite to each other in the center of a liquid crystal layer and spacers formed within the active and dummy areas of the first substrate and used to maintain a cell gap between the first and second substrates, comprising forming a black matrix and a color filter on the dummy area of the second substrate; patterning the color filter to form color filter patterns opposite to the spacers on the dummy area of the first substrate; and sequentially forming an overcoat layer and a common electrode on the second substrate partially covered with the color filter patterns.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
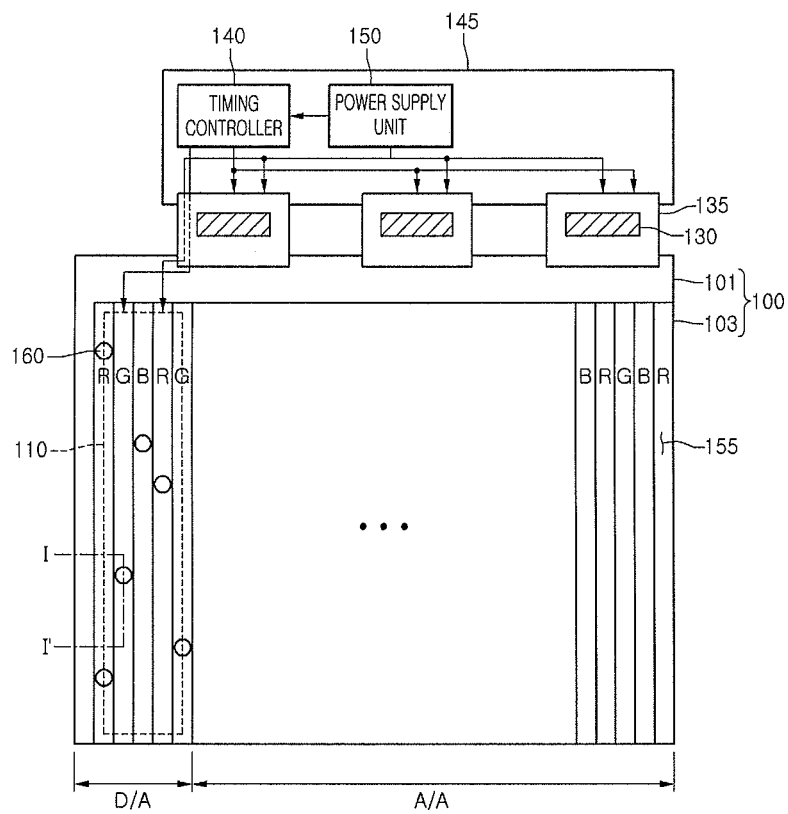
FIG. 1 is a schematic diagram showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a schematic diagram showing an LCD device according to an embodiment of the present disclosure. Referring to FIG. 1, an LCD device according to an embodiment of the present disclosure includes an LCD panel 100 configured to display images, a data PCB (printed circuit board) 145 separated in a fixed interval from the LCD panel 100, and a plurality of data TCPs (tape carrier packages) 135 positioned between the LCD panel 100 and the data PCB 145. The LCD panel 100 is configured to include a plurality of gate lines and a plurality of data lines on it. Each of the data TCPs 135 is connected to one edge of the LCD panel 100 and one edge of the data PCB 145. Also, each of the data TCPs 135 is provided with a data driver integrated-circuit (IC) chip 130 mounted on it.

The LCD panel 100 is configured to include a thin film transistor array substrate 101 and a color filter array substrate 103. The plurality of gate lines and the plurality of data lines are formed to cross each other on the thin film transistor array substrate 101 and define pixel regions. The color filter array substrate 103 is configured to include a plurality of red (R), green (G), and blue (B) color filters 155, a black matrix (not shown), and a common electrode (not shown) which are formed on it. The black matrix is formed to put on the rim of each color filter 155 and screen the gate lines and the data lines. The common electrode is formed to cover the color filters 155 and the black matrix.

A liquid crystal layer (not shown) is interposed between the thin film transistor array substrate 101 and the color filter array substrate 103. One short edge and one long edge of the thin film transistor array substrate 101 are configured to protrude outwardly from the color filter array substrate 103. To rectify this, the thin film transistor array has a larger size than the color filter array substrate 103. The thin film transistor array substrate 101 is configured to include a thin film transistor (not shown) TFT, a pixel electrode (not shown), and a storage capacitor (not shown) Cst which are formed within each pixel region. The storage capacitor Cst is used for maintaining a voltage charged in a liquid crystal cell Clc of the liquid crystal layer. Such a storage capacitor Cst can be formed between the liquid crystal cell Clc and a previous gate line. Alternatively, the storage capacitor Cst can be formed between the liquid crystal cell Clc and an additional (or a separated) common line.

The LCD panel 100 can be divided into an active area A/A used for displaying images and a dummy area D/A not used for displaying images. A gate driving circuit 110 configured to drive the plurality of gate lines is mounted on the dummy area D/A of the LCD panel 100. Also, column spacers 160 used for maintaining a uniform cell gap between the thin film transistor array substrate 101 and the color filter array substrate 103 are formed on the active and dummy areas A/A and D/A of the LCD panel 100.

Each data TCP 135 load with the data driver IC chip 130 is configured to include input pads and output pads electrically formed to be connected to the data driver IC chip 130 on it. The input pads on each of the data TCPs 135 are electrically connected to the data PCB 145, and the output pads are electrically connected to a part of the LCD panel 100. As such, digital image signals applied from an external system are converted into analog signals by the data driver IC chips 130 and then are supplied to the data lines on the LCD panel 100.

The data PCB 145 is configured to include a timing controller 140 and a power supply unit 150 which are mounted on it. The timing controller 140 is configured to control the gate driving circuit 100 and the data driver IC chips 130 with the desired timings. The power supply unit 150 is configured to generate voltages necessary to drive the gate driving circuit 110 and the data driver IC chips 130.

Figure 2:
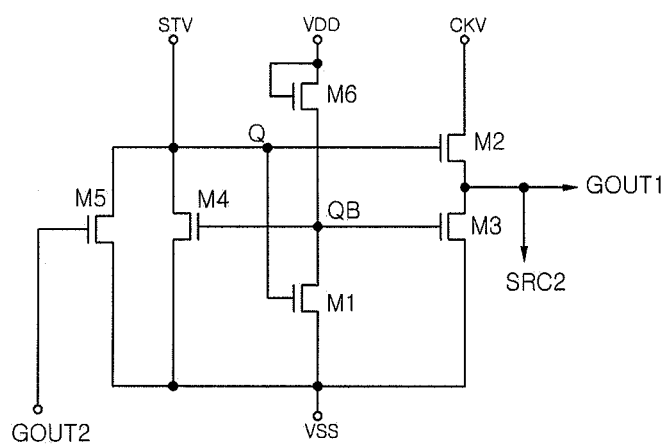
FIG. 2 is a circuit diagram briefly showing a part of the gate driving circuit in FIG. 1.

The gate driving circuit 110 mounted on the dummy area D/A of the LCD panel 100 is configured to include a plurality of stages opposite to the plurality of gate lines. Each of the stages can be configured to include 6 transistors M1~M6 as shown in FIG. 2. In other words, the transistor configuration and the number of transistors in each of the stages can be modified in a variety of manners. The plurality of stages are driven by a first clock signal CKV and a second clock signal CKVB having an inverted phase in comparison with the first clock signal CKV. More specifically, the plurality of stages respond in complement and alternately to the first and second clock signals CKV and CKVB. For example, if a first stage CRS1 is configured to respond to the first clock signal CKV, a second stage CRS2 can be configured to respond to the second clock signal CKVB. As the plurality of stages included in the gate driving circuit 110 have the same configuration as one another, for the convenience of explanation, an example of the first stage CRS1 will now be described with reference to FIG. 2.

When a start pulse signal STV is applied from the timing controller 140 to the first stage CRS1, the start pulse signal STV is charged in a node Q and a first transistor M1 is turned-on (or activated). Then, a different voltage VDD–VSS between first and second supply voltages VSS and VDD is divided on the basis of a resistance ratio of the first transistor M1 and a sixth transistor M6, thereby enabling a voltage on a node QB to be discharged at a low voltage.

As such, a first output signal GOUT1 is output by the first clock signal CKV during the enabled period of the first clock signal CKV. More specifically, if the first clock signal CKV is applied to a second transistor M2, a bootstrapping phenomenon is generated by a parasitic capacitor Cgd between gate and drain electrodes of the second transistor M2. Then, a higher voltage than the start pulse signal is charged in the node Q. Accordingly, the second transistor M2 is turned-on (or activated) enough to output the first clock signal CKV as the first output signal GOUT1.

Subsequently, the first stage CRS1 is reset by a second output signal GOUT2 from a next stage CRS2 during an enable period of the second clock signal CKVB. More specifically, a fifth transistor is turned-on (or activated) by the second output signal GOUT2 from the next stage CRS2. Then, the voltage on the node Q is discharged through the fifth transistor M5 and becomes the first supply voltage VSS. Also, the first transistor M1 is turned-off by the discharged voltage on the node Q and allows the second supply voltage VDD to be charged in the node QB through the sixth and first transistors M6 and M1. The charged voltage on the node QB forces third and fourth transistors M3 and M4 to be turned-on. As such, the voltage on the node Q is more easily discharged by the first supply voltage which is applied via the turned-on fourth transistor M4. Also, the first output signal GOUT is discharged through the turned-on third transistor M3 and becomes the first supply voltage VSS.

Figure 3:
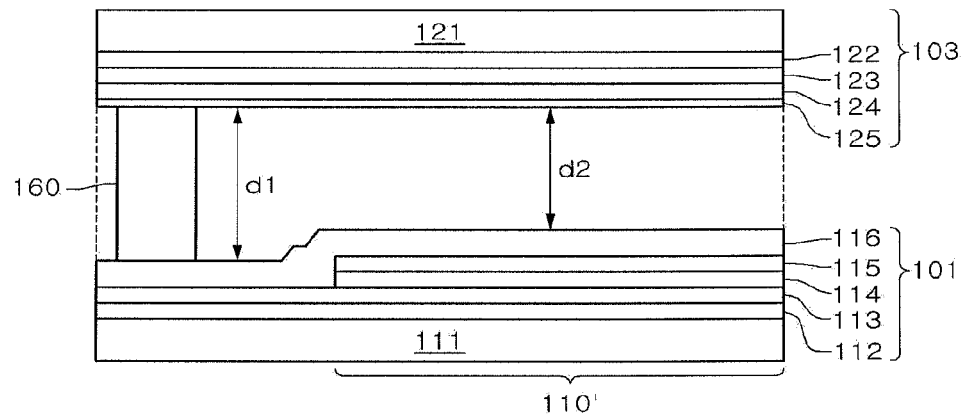
FIG. 3 is a cross-sectional view showing the cross-sectional surface of an LCD panel taken along a line I-I' of FIG. 1.

FIG. 3 is a cross-sectional view showing the cross-sectional surface of an LCD panel taken along a line I-I' of FIG. 1. As shown in FIGS. 1 and 3, the dummy area D/A of the LCD panel 100 is occupied by the thin film transistor array substrate 101 and the color filter array substrate 103.

The thin film transistor array substrate 101 is configured to include a gate metal layer 112 formed on a glass substrate 111, a gate insulation film 113 formed to cover the gate metal layer 112, a semiconductor layer 114 and a source/drain metal layer 115 sequentially formed on the gate insulation film 113, and a passivation layer (or a protective layer) 116 formed to cover the source/drain metal layer 115. The gate metal layer 112, the semiconductor layer 114, and the source/drain metal layer 115 can form the transistors included in the gate driving circuit 110 shown in FIG. 1.

The color filter array substrate 103 is configured to include a black matrix 122 formed on a second glass substrate 121, a green (G) color filter layer 123 formed on the black matrix 122, and a planarization layer 124 formed on the green (G) color filter layer 123. The color filter array substrate 103 further includes a common electrode layer 125 formed on the planarization layer 124.

Moreover, a column spacer 160 used for maintaining a uniform cell gap is positioned between the thin film transistor array substrate 101 and the color filter array substrate 103. The column spacer 160 is secured to a portion (or a region) of the thin film transistor array substrate 101 on which the gate driving circuit 110 is not formed. The green (G) color filter layer 123 on the color filter array substrate 103 is formed simultaneously with a green color filter of the color filter 155 which is positioned on the active area A/A of the LCD panel (100 in FIG. 1). To rectify this, the green (G) color filter layer 123 formed on the dummy area D/A of the color filter array substrate 103 corresponds to the green (G) color filter formed on the active area A/A of the LCD panel 100 (i.e., on the active area A/A of the color filter array substrate 103).

In this manner, the green (G) color filter layer 123 is formed on the dummy area D/A of the LCD panel 100 in which the column spacers 160 are positioned. As such, the column spacers 160 within the dummy area D/A can be secured in the same alignment as those within the active area A/A. Accordingly, the column spacers 160 are uniformly formed not only on the dummy area D/A but also on the active area A/A.

On the other hand, a first cell gap d1 in a first region at which the column spacer 160 is positioned (i.e., a first distance d1 between the thin film transistor array substrate 101 and the color filter array substrate 103 within the first region) is about 2.85 μm. A second distance d2 between the thin film transistor array substrate 101 and the color filter array substrate 103 in a second region, on which the column spacer 160 is not positioned and the gate driving circuit is formed, is about 2.83 μm. To rectify this, the LCD panel 100 has a structure that the distance between the thin film transistor array substrate 101 and the color filter array substrate 103 becomes shorter in the second region not having the gate driving circuit 110 rather than the first region having the gate driving circuit 110. As such, the capacitance caused between the gate driving circuit 110 on the thin film transistor array substrate 101 and the common electrode layer 125 on the color filter array substrate 103 increases. The increased capacitance between the thin film transistor array substrate 101 and the color filter array substrate 103 affects more of the node Q within the gate driving circuit 110, so that the output characteristic of the gate driving circuit 110 is deteriorated.

Figure 4:
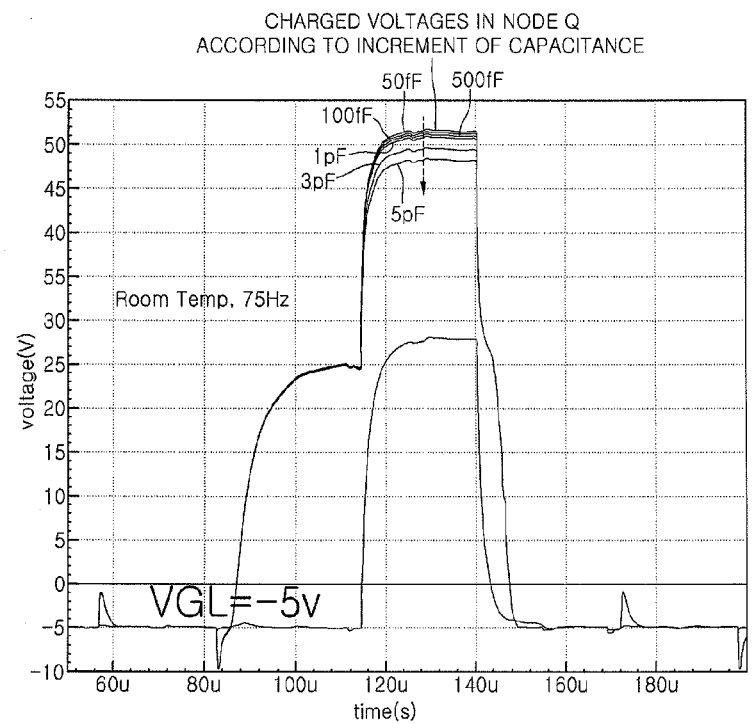
FIG. 4 is a graphic data sheet explaining the voltage characteristic on a node Q of the gate driving circuit in accordance with an increment of the capacitance.

FIG. 4 is a graphic data sheet explaining the voltage characteristic on a node Q of the gate driving circuit in accordance with an increment of the capacitance. As illustrated in FIG. 4, a voltage on the node Q within the gate driving circuit 110 is gradually reduced according to the increment of capacitance between the thin film transistor array substrate 101 and the color filter array substrate 103. The reduced voltage of the node Q within the gate driving circuit distorts a scan signal to be output to the gate line on the LCD panel (100 in FIG. 1), thereby deteriorating the output characteristic of the gate driving circuit 110.

To address this problem, an LCD device according to another embodiment of the present disclosure will now be proposed.

Figure 5:
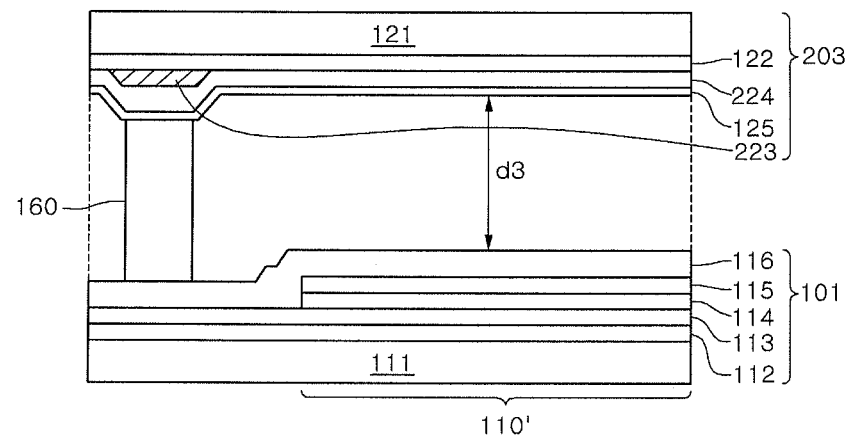
FIG. 5 is a cross-sectional view showing the cross-sectional surface of an LCD panel which is included in an LCD device according to another embodiment of the present disclosure and taken the same as FIG. 3.

FIG. 5 is a cross-sectional view showing the cross-sectional surface of an LCD panel which is included in an LCD device according to another embodiment of the present disclosure and taken the same as FIG. 3. As shown in FIG. 5, an LCD device according to another embodiment of the present disclosure includes a thin film transistor array substrate 101 and a color filter array substrate 203 separated by a fixed distance in the center of a column spacer 160 within the dummy area D/A of an LCD panel (100 in FIG. 1).

The thin film transistor array substrate 101 is configured to include a gate metal layer 112 formed on a glass substrate 111, a gate insulation film 113 formed to cover the gate metal layer 112, a semiconductor layer 114 and a source/drain metal layer 115 sequentially formed on the gate insulation film 113, and a passivation layer (or a protective layer) 116 formed to cover the source/drain metal layer 115. The gate metal layer 112, the semiconductor layer 114, and the source/drain metal layer 115 can form the transistors included in the gate driving circuit 110 shown in FIG. 1.

The color filter array substrate 203 is configured to include a black matrix 122 formed on a second glass substrate 121, a green (G) color filter pattern 223 formed on the black matrix 122, and an overcoat layer 224 formed on the black matrix 122 with the green (G) color filter pattern 223. The color filter array substrate 203 further includes a common electrode layer 125 formed on the overcoat layer 224.

Moreover, a column spacer 160 is secured to a portion (or a region) of the thin film transistor array substrate 101 as already described above. Accordingly, the thin film transistor array substrate 101 and the color filter array substrate 202 can maintain a fixed cell gap.

The green (G) color filter pattern 223 on the color filter array substrate 203 is formed opposite to the column spacer 160 secured to the thin film transistor array substrate 101. To rectify this, the green (G) color filter pattern 223 is positioned at a portion (or a region) of the color filter array substrate 203 opposite to a location of the column spacer 160 within the dummy area D/A. The green (G) color filter pattern 223 can be formed to have a larger length range of about 1% and a larger width range of about 5% than the width of the column spacer 160, if the column spacer 160 has a width of 20 µm. Also, the green (G) color filter pattern 223 is formed only on the portion (or region) opposite to the column spacer 160. In other words, the green (G) color filter pattern 223 is not formed on other portions (or other regions) opposite to circuit elements (including nodes Q and QB) of the gate driving circuit (110 in FIG. 1). Such a green (G) color filter pattern 223 can be formed in a variety of shapes including an island shape.

In this manner, the green (G) color filter pattern 223 is formed on the portion (region) of the color filter array substrate 203 opposite to the column spacer 160. As such, a third distance d3 between the color filter array substrate 203 and the thin film transistor array substrate 101 in the portions (or regions) occupied by the gate driving circuit 110 increases. Actually, the third distance d3 between the portion of the thin film transistor array substrate 101 occupied by the gate driving circuit 110 and the portion of the color filter array substrate 203 not occupied by the green (G) color filter pattern 223 becomes about 5.03 µm.

In accordance therewith, the capacitance caused between the gate driving circuit 110 on the thin film transistor array substrate 101 and the common electrode layer 125 on the color filter array substrate 203 within the dummy area D/A is greatly reduced in comparison with that in the LCD device according to the previous embodiment of the present disclosure. The voltage on the node Q of the gate driving circuit 110 is minimally affected by the minimized capacitance between the gate driving circuit 110 and the common electrode layer 125. Accordingly, the output characteristic of the gate driving circuit 110 positioned in the dummy area D/A can be enhanced, as well as the reliability of an LCD device can be improved.

Figure 6A:
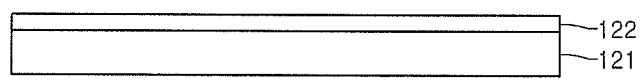
FIGS. 6A to 6C are cross-sectional views illustrating a process of manufacturing a color filter array substrate shown in FIG. 5.
Figure 6B:
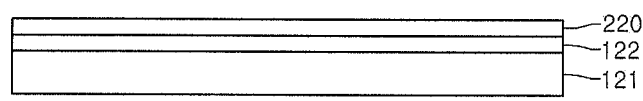
Figure 6C:
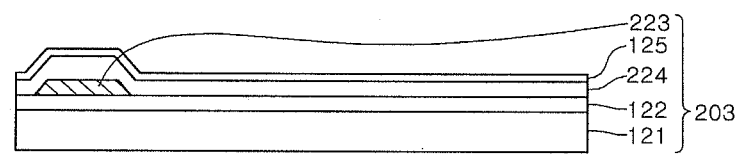

FIGS. 6A to 6C are cross-sectional views illustrating a process of manufacturing a color filter array substrate shown in FIG. 5. As shown in FIGS. 6A and 6B, a black matrix layer 122 and a green (G) color filter layer 220 are sequentially formed on a second glass substrate 121.

The green (G) color filter layer 220 is patterned by a photolithography process, thereby preparing a green (G) color filter pattern 223 on the black matrix layer 122 as shown in FIG. 6C. The green (G) color filter pattern is formed opposite to only a column spacer (160 in FIG. 5) secured to a thin film transistor array substrate (101 in FIG. 5). In other words, the green (G) color filter pattern 223 is not formed on other portions (or other regions) of the color filter array substrate 203 opposite to the gate driving circuit (110 in FIG. 5) of the thin film transistor array substrate (101 in FIG. 5).

Subsequently, an overcoat layer 224 and a common electrode layer 125 are sequentially formed on the black matrix layer 122 partially covered with the green (G) color filter pattern 223. The overcoat layer 224 and the common electrode layer 125 can be formed to have uniform thicknesses, respectively.

In this way, the green (G) color filter pattern 223 is formed only on the portion (region) of the color filter array substrate 203 opposite to the column spacer 160. As such, a distance between the color filter array substrate 203 and the thin film transistor array substrate 101 in the portions (or regions) occupied by the gate driving circuit 110 increases. In accordance therewith, a capacitance caused between the gate driving circuit 110 on the thin film transistor array substrate 101 and the common electrode layer 125 on the color filter array substrate 203 within the dummy area D/A of the LCD panel 100 is reduced. The voltage on the node Q of the gate driving circuit 110 is minimally affected by the minimized capacitance between the gate driving circuit 110 and the common electrode layer 125. Accordingly, the output characteristic of the gate driving circuit 110 positioned in the dummy area D/A can be enhanced, as well as the reliability of an LCD device can be improved.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A liquid crystal display device comprising:
   a first substrate configured to include an active area including a plurality of thin film transistors, a plurality of pixel electrodes, a plurality of gate lines, and a plurality of data lines for displaying an image, and a dummy area loaded with a driving circuit which is connected to the plurality of gate lines;
   a second substrate, opposite to the first substrate, that includes a common electrode together with the plurality of pixel electrodes used for forming electric fields, and color filters and a black matrix formed opposite to the active area;
   column spacers secured to the first substrate within the active and dummy areas and configured to maintain a constant cell gap between the first and second substrates; and
   a liquid crystal layer interposed between the first and second substrates,
   wherein the second substrate further includes color filter patterns on its portions opposite to only the column spacers within the dummy area,
   wherein the color filter patterns are not formed on other portion opposite to circuit elements of the driving circuit,
   wherein a width of the color filter pattern is formed to have a larger width range of about 5% than a width of the column spacer, and
   wherein a first distance between the thin film transistor array substrate and color filter array substrate within the first region, on which the column spacer is positioned is longer than a second distance between the thin film transistor array substrate and the color filter array substrate in a second region, on which the column spacer is not positioned and the gate driving circuit is formed.

2. The liquid crystal display device claimed as claim 1, wherein the color filter patterns on the second substrate are formed of the same material as the color filters on the active area.

3. The liquid crystal display device claimed as claim 1, wherein the color filter pattern is formed in an island shape.

4. The liquid crystal display device claimed as claim 1, wherein the color filter patterns on the second substrate are separated from the gate driving circuit included in the dummy area of the first substrate.

5. A method of manufacturing a liquid crystal display device which includes first and second substrates each defined into an active area and a dummy area and combined opposite to each other in the center of a liquid crystal layer and spacers formed within the active and dummy areas of the first substrate and used to maintain a cell gap between the first and second substrates, comprising:
   forming a black matrix and a color filter on the dummy area of the second substrate;
   patterning the color filter to form color filter patterns opposite to the spacers on the dummy area of the first substrate; and
   sequentially forming an overcoat layer and a common electrode on the second substrate partially covered with the color filter patterns
   wherein the color filter patterns are not formed on other portion opposite to circuit elements of the driving circuit,
   wherein a width of the color filter pattern is formed to have a larger width range of about 5% than a width of the column spacer, and
   wherein a first distance between the thin film transistor array substrate and color filter array substrate within the first region, on which the column spacer is positioned is longer than a second distance between the thin film transistor array substrate and the color filter array substrate in a second region, on which the column spacer is not positioned and the gate driving circuit is formed.

6. The method claimed as claim 5, wherein the color filter pattern is formed in an island shape.

* * * * *